United States Patent
Bolin

(10) Patent No.: US 10,172,342 B2
(45) Date of Patent: Jan. 8, 2019

(54) APPARATUS FOR PEST CONTROL

(71) Applicant: David G. Bolin, Raleigh, NC (US)

(72) Inventor: David G. Bolin, Raleigh, NC (US)

(73) Assignee: BASF SE, Ludwigshafen (DE)

( * ) Notice: Subject to any disclaimer, the term of this patent is extended or adjusted under 35 U.S.C. 154(b) by 51 days.

(21) Appl. No.: 14/287,554

(22) Filed: May 27, 2014

(65) Prior Publication Data

US 2014/0366429 A1    Dec. 18, 2014

Related U.S. Application Data

(63) Continuation of application No. 12/863,886, filed as application No. PCT/EP2009/050765 on Jan. 23, 2009.

(60) Provisional application No. 61/023,553, filed on Jan. 25, 2008.

(51) Int. Cl.
*A01M 1/20* (2006.01)
*A01M 1/02* (2006.01)

(52) U.S. Cl.
CPC ............ *A01M 1/2016* (2013.01); *A01M 1/02* (2013.01)

(58) Field of Classification Search
CPC ........ A01M 1/00; A01M 1/02; A01M 1/2016; A01M 1/20; A01M 1/2011; A01M 2200/012; A01M 2200/011; A01M 2200/01
USPC ........................ 43/107, 122, 124, 131, 132.1
See application file for complete search history.

(56) References Cited

U.S. PATENT DOCUMENTS

| | | | | |
|---|---|---|---|---|
| 1,671,404 A | * | 5/1928 | Cherry | A01M 1/08 15/339 |
| 1,723,919 A | * | 8/1929 | Bykowy | A01M 1/145 43/107 |
| 1,885,854 A | * | 11/1932 | Montellano | A01M 1/08 43/139 |
| 3,965,609 A | * | 6/1976 | Jordan | A01M 25/004 43/131 |
| 4,027,420 A | * | 6/1977 | McKibben | A01M 1/2011 43/124 |
| 4,283,878 A | | 8/1981 | Hill et al. | |
| 4,694,604 A | * | 9/1987 | Mitchell | A01M 1/02 43/107 |

(Continued)

FOREIGN PATENT DOCUMENTS

| | | |
|---|---|---|
| AU | 199914733 | 8/1999 |
| DE | 341946 | * 10/1921 |

(Continued)

OTHER PUBLICATIONS

Wikipedia.com "Fly".*

(Continued)

*Primary Examiner* — Thanh Pham
(74) *Attorney, Agent, or Firm* — Brinks Gilson & Lione

(57) ABSTRACT

The present invention relates to an apparatus for pest control; and to the use of said apparatus for pest control. The apparatus comprises a hollow station forming at least one entrance for the pests to be controlled; a pheromone of a pest to be controlled; and a contact pesticide for the pests to be controlled, said contact pesticide being provided inside said hollow station, and the hollow station being designed to prevent the pests from remaining within said hollow station without expenditure of energy.

18 Claims, 5 Drawing Sheets

(56) References Cited

U.S. PATENT DOCUMENTS

| | | | |
|---|---|---|---|
| 4,794,724 A | | 1/1989 | Peters |
| 5,239,771 A | | 8/1993 | Beardsley |
| 5,259,153 A | * | 11/1993 | Olive ............... A01M 1/145 |
| | | | 136/291 |
| D347,676 S | | 6/1994 | Van Wallendael |
| 5,359,807 A | * | 11/1994 | Jackson ............ A01M 1/2016 |
| | | | 43/131 |
| 5,531,043 A | * | 7/1996 | Shiboh .................. A01M 1/14 |
| | | | 43/121 |
| 6,202,341 B1 | * | 3/2001 | Bernard ............. A01M 1/2005 |
| | | | 43/122 |
| 6,789,352 B2 | | 9/2004 | Price et al. |
| 6,901,694 B1 | * | 6/2005 | Neault ................ A01M 1/2011 |
| | | | 43/131 |
| 2001/0025447 A1 | | 10/2001 | Nimocks, III |
| 2004/0025413 A1 | | 2/2004 | Barazani |
| 2005/0132637 A1 | * | 6/2005 | Deakins ............. A01M 25/004 |
| | | | 43/131 |
| 2005/0166446 A1 | * | 8/2005 | Middlebrook ....... A01M 1/2011 |
| | | | 43/124 |
| 2005/0210735 A1 | * | 9/2005 | Harmer .................. A01M 1/02 |
| | | | 43/107 |
| 2006/0086039 A1 | | 4/2006 | Israely et al. |
| 2006/0254123 A1 | | 11/2006 | Su |
| 2007/0071784 A1 | | 3/2007 | Rakoczi et al. |
| 2008/0086932 A1 | * | 4/2008 | Cook .................... A01M 1/02 |
| | | | 43/114 |

FOREIGN PATENT DOCUMENTS

| | | | |
|---|---|---|---|
| DE | Nr115253 | * | 9/1925 |
| DE | 2412723 | * | 9/1975 |
| EP | 1203530 | | 5/2002 |
| EP | 1649747 | | 4/2006 |
| FR | 738663 | * | 12/1932 |
| WO | WO 2006/045122 | | 4/2006 |
| WO | WO 2006045122 | * | 4/2006 |
| WO | WO 2006/056032 | | 6/2006 |
| WO | WO 2009/006158 | | 1/2009 |
| WO | WO 2010109427 | * | 9/2010 |

OTHER PUBLICATIONS

"The Wonderful World of Insects".*

International Search Report for International Application No. PCT/EP2009/050765.

International Preliminary Report on Patentability for International Application No. PCT/EP2009/050765.

Uchida et al., "Nontarget arthropods captured in cue-lure baited bucket traps at area-wide pest management implementation sites in Kamuela and Kula, Hawaiian Islands", Proc. Hawaiian Entomol. Soc., 2003, 36:135-143.

Egyptian Office Action for PCT/NA2010/1232, presented on Jul. 10, 2010.

* cited by examiner

APPARATUS FOR PEST CONTROL

CROSS-REFERENCES TO RELATED APPLICATIONS

This application is a continuation application of U.S. application Ser. No. 12/863,886, filed Jul. 21, 2010, which is a National Stage application of International Application No. PCT/EP2009/050765 filed Jan. 23, 2009, the entire contents of which is hereby incorporated by reference. This application also claims the benefit of U.S. Provisional Application No. 61/023,553 filed Jan. 25, 2008, the entire contents of which is hereby incorporated herein by reference.

BACKGROUND OF THE INVENTION

The present invention relates to an apparatus for pest control; and to the use of said apparatus for pest control.

A number of the more than 3000 species of tephritid fruit flies, in particular those of the genera *Ceratitis, Dacus, Bactrocera* and *Rhagoletis*, are important horticultural pests. The insects lay their eggs into mostly species-specific host plants after which many of the species are named (e. g. olives for *Bactrocera oleae*, squashes and pumpkins for *B. cucurbitae*, etc.), and the hatching larvae can cause extensive feeding damage, in particular by their often marked preference for either vulnerable parts of their host plant such as flowers (anthophagy) or the parts of the host plants intended to be marketed, such as fruits (carpophagy). Control of these pests, which, when occurring in larger amounts, may totally destroy the local harvest, is thus highly desirable but complicated by the fact that only about a third of the tephritid species described so far act as pests, whereas the remainder includes some important ecological regulators, such as species whose host plants are themselves agricultural pests.

Selective control of tephritid pests, as of many other insect pests, has exploited these insects' use of species-specific pheromones during mating. By using such pheromones, which are generally produced by the females and hence act as powerful attractants to males of the same species, it is possible to lure the male specimens of the species of interest into traps comprising a small amount of a contact pesticide sufficient for destroying them ("attract and kill" strategy). This general approach offers a number of advantages over more conventional applications of pesticides: Only a limited amount of the pesticide is required, which makes pest control cheaper, avoids ecological problems and reduces the health hazard to workers. Moreover, it is possible to selectively target species of interest, as the attractant can be selected to ensure that non-target species will not be lured into the traps.

In its simplest form, a pheromone-baited trap consists of an object that is freely accessible to the pests and comprises both a pheromone and a contact pesticide, such as the Amulet C-L Fruit Fly Station which comprises Cue-lure (=4-[p-hydroxyphenyl]-2-butanone acetate) as a pheromone specific for the horticultural pest *Bactrocera tryoni* (Queensland fruit fly) and fipronil as pesticide. However, these stations are suboptimal in that rainwater may leach the contents from the stations;

the release of the contents may also contaminate the horticultural products which they are intended to protect; and in or close to residential areas, people, in particular children, and pets might inadvertently come into contact and thus be exposed to fipronil.

These drawbacks may be overcome by placing the station in an enclosing shell or container which allows the target insects to easily access the stations while at the same time affording protection from rainwater and spatially locking out humans and larger animals, thereby forming a more selective trap for the target pests. A variety of such traps, e. g. for fruit flies, are commercially available for controlling and eradicating tephritid pests, such as Bucket traps, Steiner traps, McPhail traps, FT Wafer traps, modified soda bottle traps, modified milk jug traps, etc. They all share the common feature of "trapping" the pest, i. e., the insect lured into the trap will be killed inside, and its carcass will remain there until taken out or naturally decomposed. This offers the benefit of being able to monitor and record populations, capture being the primary purpose of these traps.

However, the disadvantage of this approach is that it is exclusively those individuals displaying active seeking behaviour which are killed. These are the males of the species of interest, which have to be considered less important for the stability and reproductive potential of the population than the females, in particular in insect pests: As a single male may mate with a larger (often by orders of magnitude) number of females during its lifespan than vice versa, even highly efficient decimation of the males is unlikely to result in effective control of the pests, since the reproduction rate of the population is essentially determined by the number of fertile females available (recent studies have shown that in some species actually destruction of up to 99% of the males of an insect pest population may not affect the population's reproductive capacity significantly). However, females are generally not attracted by the pheromones of their own species, and thus they cannot be expected to be killed by pheromone-baited traps. Thus, it is generally acknowledged that "male annihilation" feasible using the "attract and kill" strategy is unsuitable for suppressing large pest populations unless combined with other approaches—which again reduces the specific benefits of the use of pheromone-baited traps.

Furthermore, the number of pest individuals present in any given environment is usually large enough, in particular when the pest is abundant enough to be an economically significant pest, to result in swift filling up and clogging of pheromone-baited traps, preventing contact of further visiting pests with the contact pesticide, thereby effectively rendering useless the traps. Given that for efficient control a large number of traps has to be dispersed over a considerable area (depending on the target pest and the attractant available, it is recommended to set up the traps at average distances amounting to no more than 10 m-25 m from each other for highly mobile insect pests), manually clearing out the traps is not efficiently feasible, in particular as this generally requires laborious operations including soap and water. Moreover, many pests are thought to be capable of emitting a "panic signal" (e. g. particular pheromones) upon distress, thereby warning others and potentially reducing the efficacy of the bait when allowed to remain in the trap for too long. The prolonged presence of dead pests within the trap is also prone to attract non-target organisms (Uchida et al., Proc. Hawaiian Entomol. Soc. 36: 135-143, 2003), which are then liable to exposure to very high dosages of the contact pesticide employed. This is particularly undesirable as natural predators for the target pests will suffer particularly, up to the degree that the controlling effects of the system are abolished by an ensuing lack of natural predators.

BRIEF SUMMARY OF THE INVENTION

It is thus an object of the present invention to provide an apparatus for specifically and safely controlling pests, in particular horticultural pests, which does not incur the danger of accumulating bodies of dead pests and which offers the possibility of effectively reducing the reproductive potential of the target pest population.

It was now found that, when the pest control apparatus comprises the pesticide inside a hollow station, but is built to permit the target pests to escape freely, the latter will still have, before eventually succumbing to the effects of the contact pesticide, sufficient time to leave the hollow station and to contaminate, during their normal social interactions, other members of their own species with the contact pesticide, thereby spreading the effect also to individuals which have never entered said apparatus and effectively multiplying the control effect ("cascade effect of mortality"). This is of particular importance as this will result in a significant degree of transfer of the pesticide to the feemales, thereby much more effectively reducing the population's overall reproductive potential. Tephritids are particularly susceptible to this effect as they usually perform sophisticated mating ceremonies, allowing for plenty of contact between tainted and untainted individuals of both sexes.

Thus, an apparatus comprising the features of claim 1 and its use according to claim 15 solve the problem underlying the invention. Particular embodiments of the invention are as described in the dependent claims.

BRIEF DESCRIPTION OF THE DRAWINGS

FIG. 3A shows a cross-section through a reference apparatus. FIG. 3B correspondingly depicts the geometry of the apparatus of the invention.

FIG. 4A shows a cross-section through a reference apparatus. FIG. 4B correspondingly depicts the geometry of the apparatus of the invention.

DETAILED DESCRIPTION OF THE INVENTION

Figure 1A:
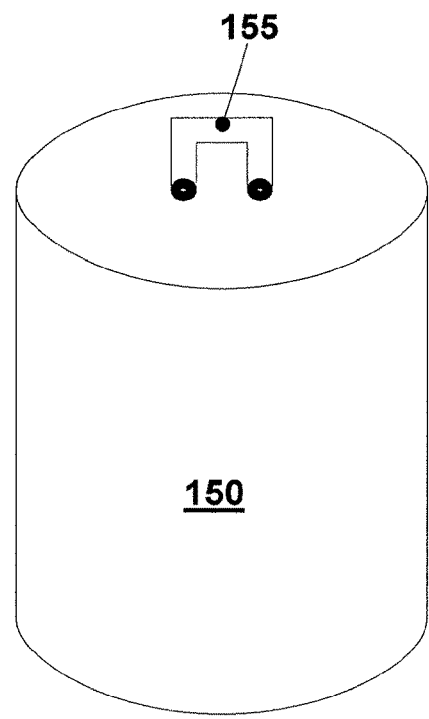
FIGS. 1A and 1B schematically depict an embodiment of the apparatus of the invention, comprising a hollow dome, wherein FIG. 1A provides a depiction of the apparatus as seen from outside, and FIG. 1B provides a cross-section.

In one aspect, the invention thus relates to an apparatus for pest control comprising
a hollow station forming at least one entrance for the pests to be controlled;
a pheromone of a pest to be controlled; and
a contact pesticide for the pests to be controlled,
said contact pesticide being provided inside said hollow station, and the hollow station being designed to prevent the pests from remaining within said hollow station without expenditure of energy.

As used herein, the term "pheromone" is used to denote any agent or mixture or formulation of agents that has a strong and specific attraction for an individual insect species or any particular subgroup (developmental stage, sex, etc.) thereof, preferably such as are identical to the substances secreted by members of the target species themselves.

For a large and increasing number of target species, suitable pheromones are available. In particular fruit fly pheromones are preferred.

In a particularly preferred embodiment of the invention, the pheromone is 4-[p-hydroxyphenyl]-2-butanone acetate or methyl eugenol, preferably 4-[p-hydroxyphenyl]-2-butanone acetate.

As used herein, the term "contact pesticide" is used to denote any agent or mixture or formulation of agents that upon contact exerts a damaging influence on a pest as defined hereinbefore, e. g. that kills or disables the target pest or significantly interferes with its activities such as its feeding and/or reproduction, preferably kills the pest, without the need for active uptake (ingestion) by the target pest. Preferably, the contact pesticide acts slowly, more preferably so that under the conditions encountered the target pest can be expected to be still alive when leaving the apparatus of the invention.

Basically, contact pesticides may be of any nature, including biological agents such as bacteria, viruses and fungi specific for the target pests, but chemical pesticides are most preferred. Appropriate chemical contact pesticides useful in the invention as well as their dosages and means for their synthesis and application are well-known to the person of average skill in the art and include, without being limited to contact insecticides In a particular embodiment of the invention, the contact pesticide is selected from the group consisting of phenylpyrazoles, preferably the group consisting of fipronil, acetoprole and ethiprole and more preferably fipronil; neonicotinoides, preferably the group consisting of imidacloprid, thiamethoxam, clothianidin, acetampirid and thiacloprid; organo(thio)phosphates, preferably the group consisting of fenthion, fenitrothion, naled and malathion; macrocyclic lactones, preferably spinosad; and carbamates, preferably the group consisting of methomyl and carbaryl.

As used herein, the term "expenditure of energy" is used to denote any activity of the target pest that requires energy-consuming and coordinated activity and will therefore cease when the pest is dead or disabled, such as flying, walking, climbing, crawling, grabbing, holding, etc. A pest is considered as "disabled" when it is, in spite of still maintaining certain essential physiological functions, no longer capable of such coordinated activity and therefore prone to falling out of the apparatus of the invention.

It will be appreciated that an apparatus designed to prevent pests from remaining inside will preferably not trap pests. As used herein, the term "trap" is used to denote a spatial situation wherein the pest of interest is prevented from actively finding a way out of the apparatus.

It is particularly preferred that the apparatus comprises facilities for providing both the pheromone and the contact pesticide, and more preferred that the pheromone and the contact pesticide are provided in close spatial proximity within the apparatus of the invention, for example in the same element, so to increase the likelihood of the pest coming sufficiently into contact with the pesticide. In a particular embodiment, both the pheromone and the contact pesticide are provided on a combined "poison station" such as a cardboard or fibreboard block impregnated therewith. A most preferred embodiment uses the Amulet C-L Fruit Fly Station as the common carrier for the pheromone and the contact pesticide. For use with any such combined "poison station" this will typically be a hook in the ceiling of the interior cavity from which the poison station can be suspended. Alternatively, the apparatus may comprise cups or receptacles, e. g. moulded into the insides of the interior cavity, for holding the pheromone and/or the contact pesticide. The choice and arrangement of the holding facilities depends on the nature of the pheromone and the contact pesticide and on the anatomy and ethology of the target pest, and will be readily selected by the skilled artisan.

Expediently, the walls of the hollow station are essentially opaque in order to be clearly visible to the pests, thereby allowing them to easily find their way out again. In particular, the walls are UV-opaque as it is assumed, without wishing to be bound by theory, that many pests, such as most insect pests, preferably use short wavelength light for orientation.

In a particular embodiment of the invention, the apparatus comprises a means for protecting the pheromone and the contact pesticide from rainwater.

In a preferred embodiment of the invention, the inside of the hollow station does not comprise a resting place for pests.

As used herein, the term "resting place" is used to denote any location upon which pests may abide without expenditure of energy or usage of specialized organs of attachment and upon which, consequently, dead or disabled pests may accumulate, including but not limited to essentially horizontal planes, ledges and concave structures opening upwards. The person of average skill in the art will easily recognize and eliminate potential resting places for the target pests.

More preferably, at least one entrance is facing downwards.

As used herein, the term "facing downwards" is used to denote any arrangement whereby objects in free fall or sliding leave the hollow station through said entrance rather than enter it or remain in it.

In a particularly preferred embodiment of the invention, the inside walls of the hollow station provide no footing for the pests.

As used herein, the term "footing" is used to denote a surface that allows pests to get a foothold. It is within the ken of the person of average skill in the art to provide coated, e. g. waxed, or polished surfaces upon which pests are unable to gain a footing.

Preferably, the geometry of the interior of the hollow station of the apparatus is designed so that from every point in space within said interior hollow station there exists at least one linear, unimpeded line to at least one point in space outside the apparatus. As used herein, the term "unimpeded" is used to denote the absence of any spatial structure, transparent or opaque, intersecting with said line. Without wishing to be bound by theory, it is contemplated that this design will help pests to freely enter and exit the apparatus.

In a particular embodiment of the invention, the geometry of the interior of the hollow station of the apparatus is designed so that there exists at least one linear, unimpeded line from least one point in space outside the apparatus via at least one point in space within said interior hollow station to at least one other point in space outside the apparatus.

In a particular embodiment of the invention, the apparatus comprises a closed dome and one entrance facing downwards.

In another particular embodiment of the invention, the apparatus comprises an angulated tube and two entrances facing downwards.

In a particular embodiment of the invention, the entrance or entrances are further covered with a lattice or grille designed to allow entry of the target pests while locking out larger animals which are still small enough to enter the dome.

In a particular embodiment of the invention, the apparatus is designed to be dismountable. In this embodiment, the apparatus preferably comprises a plurality of individual pieces which are manufactured separately and assembled prior to use. Preferably, in this embodiment the apparatus may be disassembled and reassembled an arbitrary number of times, thereby facilitating cleaning of its interior and exchange or refilling of the pheromone and/or pesticide when required.

In a most preferred embodiment of the invention, the apparatus comprises at least two parts which can be fitted to each other by means of a screw cap linkage.

In another aspect, the invention relates to the use of the apparatus of the first aspect for pest control. Preferably, the nature and availability of the contact pesticide are selected so that during the expected stay of a target pest within the apparatus said pest is exposed to a dosage of the pesticide that is sufficient for eventually doing the intended damage but insufficient to kill the pest while it is still within the apparatus; and more preferably, so that during the expected stay of a target pest within the apparatus said pest is exposed to a dosage of the pesticide that is sufficient for eventually doing the intended damage but insufficient to reduce the pest to a disabled state while within the apparatus; and most preferably, sufficient for eventually doing the intended damage but insufficient to reduce the pest to a disabled state while within the apparatus or in its proximity.

Without wishing to be bound by theory, well-known studies involving *Ophrys* orchids suggest that when a particular attractant such the olfactory lure is not followed by the appropriately subsequent mating signals, after some time males will cease and relocate before resuming their quest for a mate. For any given species, the skilled person may easily determine this amount of time, and the most appropriate nature and availability of the contact pesticide, by observation.

In a particular embodiment of the invention, the pest is an insect pest, preferably a tephritid.

Preferably, the pheromone and/or the contact pesticide are replenished or exchanged regularly, e. g. in intervals of 90 to 120 days, while the apparatus can be reused infinitely.

EXAMPLE 1

Figure 5:
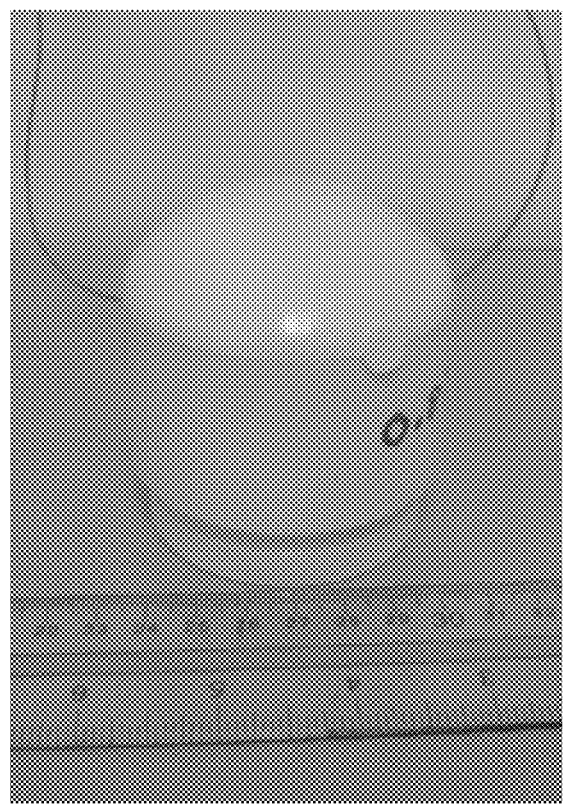
FIG. 5 shows a photograph of an exemplary embodiment of the apparatus of the invention.

In FIGS. 1 and 5, an exemplary embodiment of the invention is shown which uses a dome.

In this embodiment, the apparatus consists of a dome 150, expediently made from hard plastic such as high-density polyethylene or PVC and manufactured using any commonly employed process.

The dimensions of the apparatus are selected so to provide mechanical stability and easy handling. The dome is circular in cross-section, with an internal diameter of approximately 6 cm and a height (from the opening 160 to the top of the apex) of approximately 8 cm to 10 cm.

The dome 150 is provided with an external bail or handle 155, whereby it may be suspended or otherwise fixed at the location of use, e. g. by tying it, using a line (not shown), to a branch of a fruit tree. The external bail or handle 155 is depicted as being a separate entity; it may, however, be produced as an integral part of the dome 150, or alternatively it may be manufactured from wire, as seen in FIG. 5. When the external bail or handle 155 is a separate entity, it is attached to the dome by any commonly used means.

Optionally, the inside surface of the dome 170 may be coated (e.g. using wax) or polished so as not to afford a footing for insects.

Within the dome, there is provided an internal bail or handle 185, from which is suspended, conveniently via the line 180, the "poison station" 165 containing both the pheromone and the contact pesticide. The internal bail or handle 185 is depicted as being a separate entity; it may, however, form an integral part of the dome 150, or the external bail or handle 155 may, particularly when formed from wire, enter the interior of the dome and be used as, with its part inside, as an internal bail or handle 185, as seen in FIG. 5.

In FIG. 5, two minute holes in the wall of the dome 150 permit to introduce a single wire which is formed to afford both the external bail or handle 155 and the internal bail or handle 185.

The poison station 165 is small cardboard or fibreboard block impregnated with both the pheromone and the contact pesticide, such as the commercially available Amulet C-L Fruit Fly Station comprising Cue-lure and fipronil for control of the horticultural pest *Bactrocera tryoni* (Queensland fruit fly).

Pests may enter by way of the opening 160 when attracted by the pheromone, thereby coming into contact with the "poison station" 165 which is protected by the dome 150 from rainwater and mechanical damage, as well as from contact with humans and larger animals. They are free to move around through the internal space of the dome 150, without ever being in danger of losing sensory contact with the outside, so they can freely withdraw and leave at any time they decide so. When the onset of disabling occurs while the pests are still within the apparatus, they fall out through the entrance 160, as there are no structures to serve as a resting place.

Optionally, the entrance 160 is further covered with a lattice or grille with a size that is sufficient to allow the unhindered entry and exit of the target pests while locking out larger animals which would otherwise still be small enough to enter the dome.

Figure 1B:
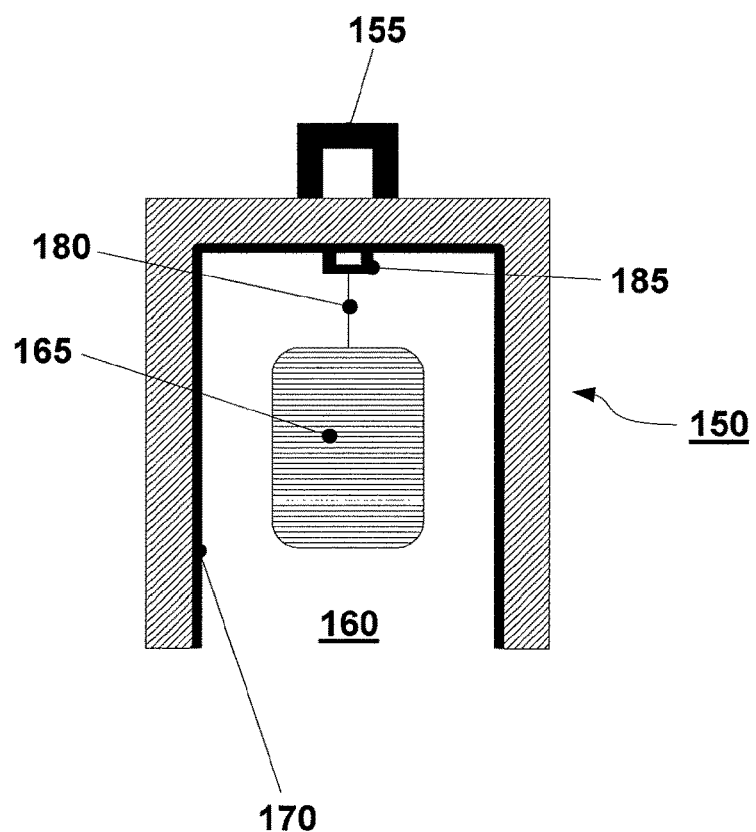
Figure 3A:
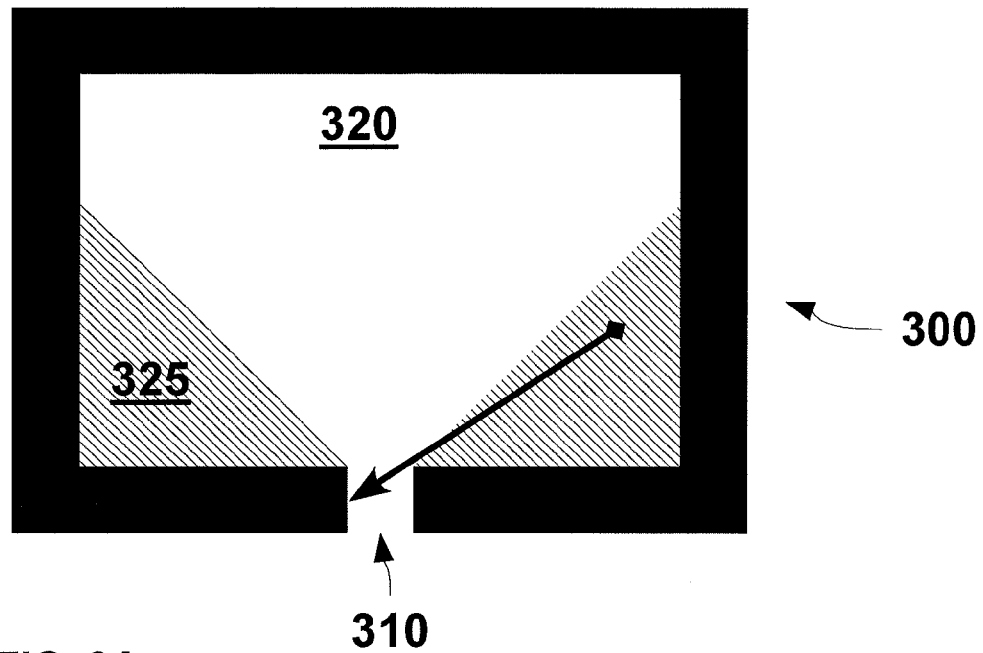
FIGS. 3A and 3B illustrate the geometry of an embodiment of the apparatus of the invention.
Figure 3B:
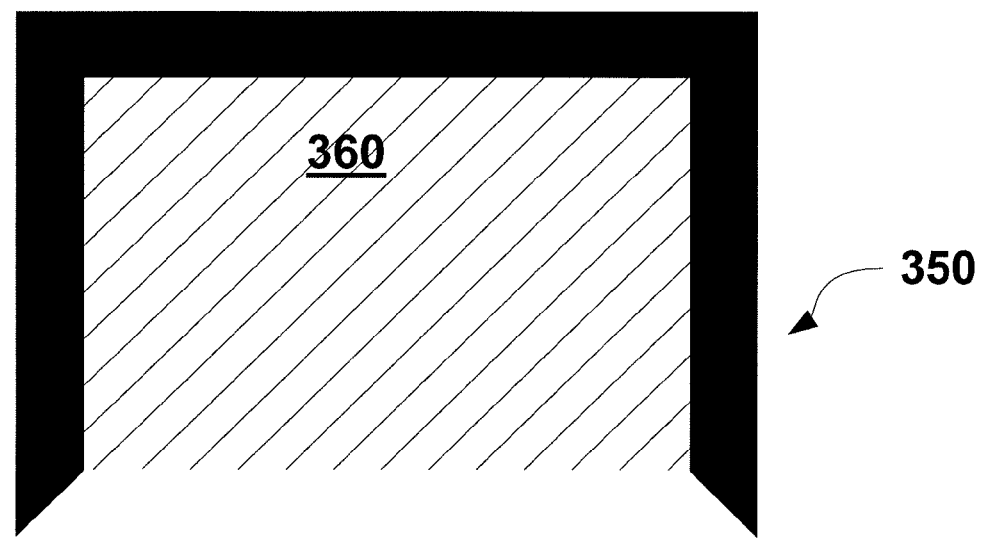

FIGS. 3A and 3B illustrate the geometry of the embodiment shown in FIGS. 1A and 1B wherein FIG. 3A shows a cross-section through a reference apparatus whereas FIG. 3B correspondingly depicts the geometry of an apparatus of the invention.

In FIG. 3A, the hollow station 300 has an orifice 310 opening into an internal cavity 320, wherein a portion 325 of the cavity 320 is located so that there is no linear, unimpeded line from any point of the portion 325 to the outside (arrow). By contrast, in FIG. 3B from every point of the interior 360 of the hollow station 350 these is at least one such linear, unimpeded line to the outside.

EXAMPLE 2

Figure 2A:
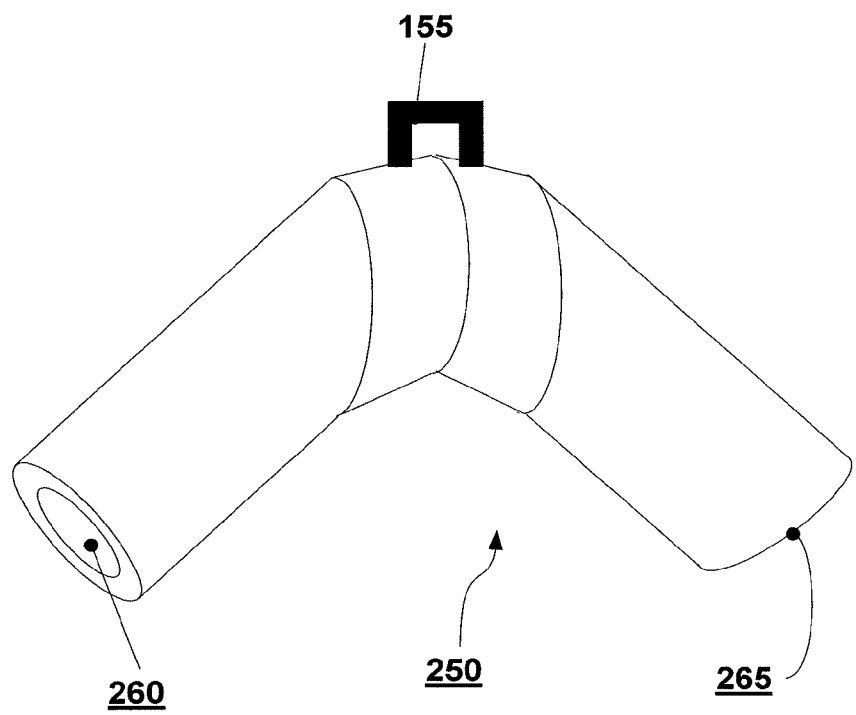
FIGS. 2A and 2B schematically depict an embodiment of the apparatus of the invention, comprising an angulated tube wherein FIG. 2A provides a depiction of the apparatus as seen from outside, and FIG. 2B provides a cross-section.
Figure 2B:
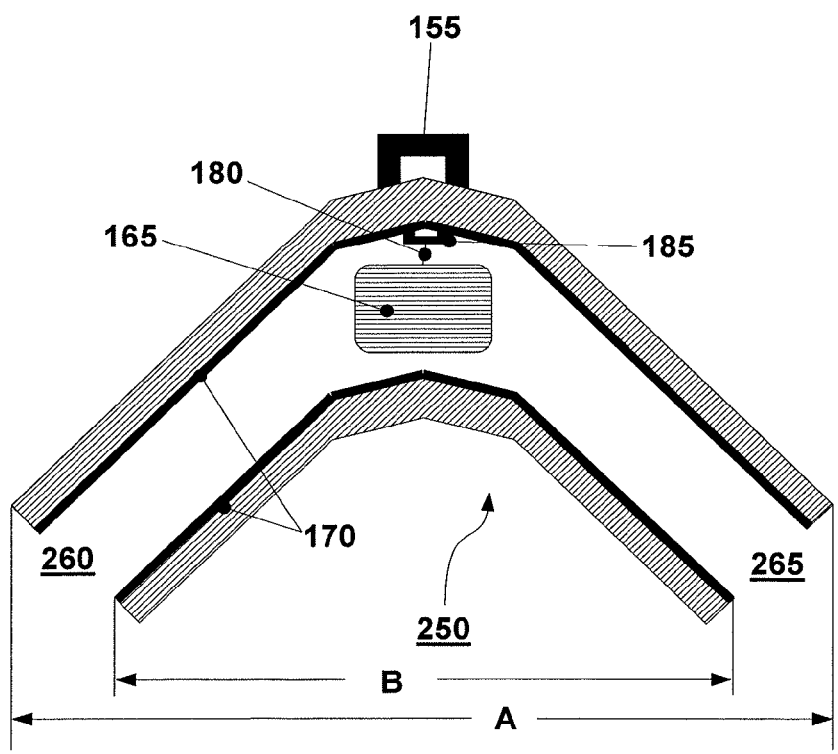
Figure 6:
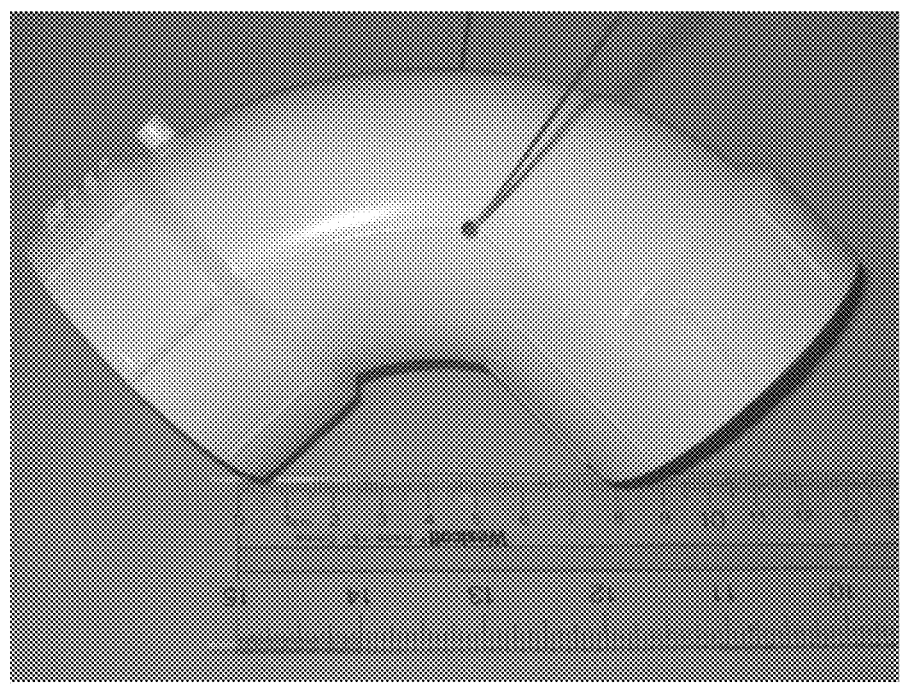
FIG. 6 shows a photograph of an exemplary embodiment of the apparatus of the invention.

FIGS. 2A and 2B and FIG. 6, an exemplary embodiment of the invention is shown which differs from that of Example 1 in that it uses an angular tube 250, comprising two openings 260 and 265, in lieu of the dome. Otherwise, the structure of the apparatus essentially corresponds to that of Example 1. The embodiments of FIGS. 2A and 2B and FIG. 6 are therefore a "flow through" design as the pests may enter at one opening 260, flow through the device and exit at the other opening 265. The angle between the two arms of the tube 250 may e.g. 45° or 90°. As it can be seen from FIG. 6 the length A (see FIG. 2B) of the upper long edge in approximately 18 cm, the length B (see FIG. 2B) of the lower short edge in approximately 7 cm FIGS. 4A and 4B illustrate the geometry of the embodiment shown in FIGS. 2A and 2B wherein FIG. 4A shows a cross-section through an apparatus being bent more whereas FIG. 4B correspondingly depicts the geometry of a preferred apparatus of the invention being bent less.

Figure 4A:
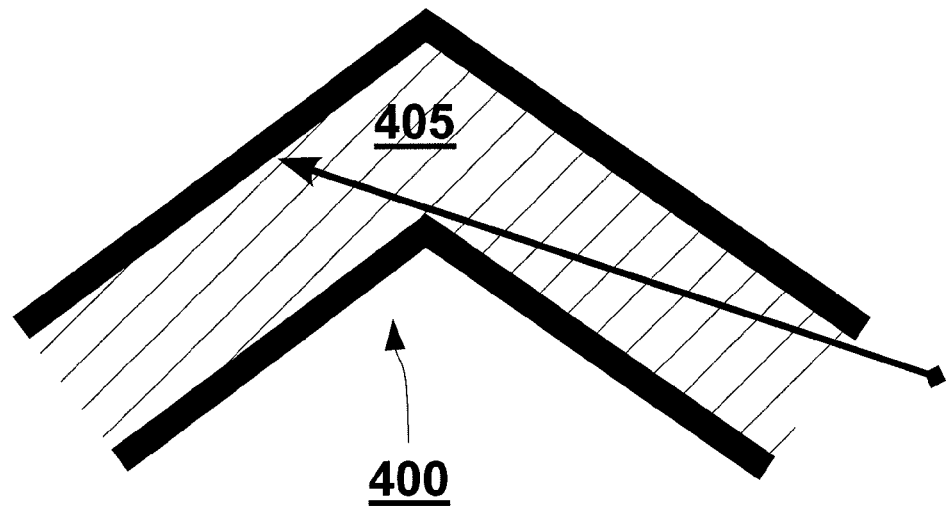
FIGS. 4A and 4B illustrate the geometry of an embodiment of the apparatus of the invention.
Figure 4B:
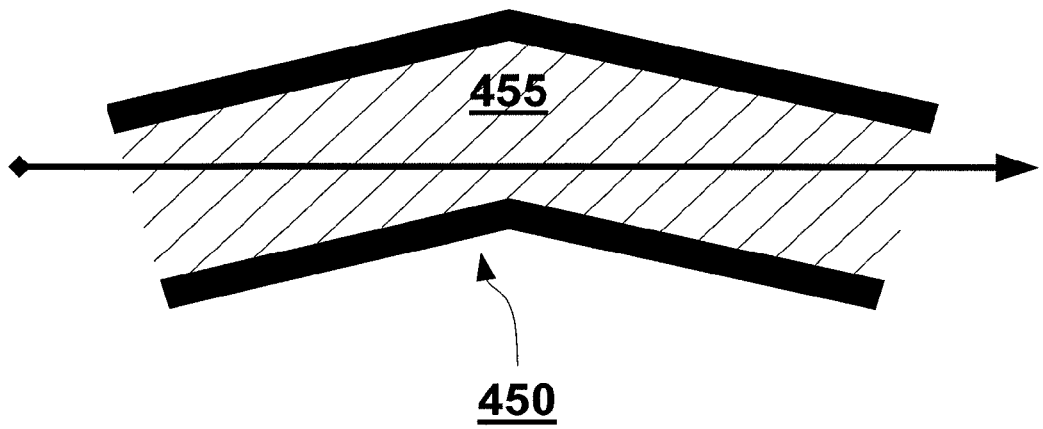

FIG. 4A, the design of the tube 400 is so that it is not possible to establish a straight line from any point outside via any point of the interior 405 to another point on the outside; by contrast, in FIG. 4B the design of the tube 450 is so that it is possible to establish a straight line from at least one point outside via at least one point of the interior 455 to another point on the outside.

What is claimed is:

1. An apparatus for pest control comprising
a hollow station suspended at a location of use;
a pheromone of a pest to be controlled; and
a contact pesticide for the pests to be controlled,
wherein the hollow station is an angulated tube comprising:
two suspended openings facing downwards;
an overall design configured to allow pests to enter and exit the hollow station while still alive and contaminate other members of their own species with the contact pesticide; and
an interior geometry designed so that from every point in space within the interior of the hollow station there exists at least one linear, unimpeded line to at least one point in space outside the apparatus,
wherein at least one of the suspended openings forms at least one entrance and one exit for the pests to be controlled, and wherein the contact pesticide is provided inside the hollow station; and
wherein the inside of the hollow station does not comprise a resting place for pests.

2. The apparatus of claim 1, wherein the pheromone is 4-[p-hydroxyphenyl]-2-butanone acetate.

3. The apparatus of claim 1, wherein the contact pesticide is selected from the group consisting of phenylpyrazole pesticides, organo(thio)phosphates, macrocyclic lactones, carbamates and neonicotinoid pesticides.

4. The apparatus of claim 3, wherein the phenylpyrazole pesticide is selected from the group consisting of fipronil, acetoprole and ethiprole.

5. The apparatus of claim 3, wherein the phenylpyrazole pesticide is fipronil.

6. The apparatus of claim 3, wherein the neonicotinoid pesticide is selected from the group consisting of imidacloprid, thiamethoxam, clothianidin, acetampirid and thiacloprid.

7. The apparatus of claim 1, wherein the hollow station protects the pheromone and the contact pesticide from rainwater.

8. A method for pest control comprising:
contacting a pest with the apparatus of claim 1.

9. The method according to claim 8, further comprising:
selecting a contact pesticide effective to kill a pest;
exposing the pest to the contact pesticide, wherein the dose of the contact pesticide is insufficient to kill the pest while still located within the apparatus.

10. The method of claim 8, wherein the pest is an insect pest.

11. The method of claim 10, wherein the insect pest is a tephritid.

12. An apparatus for pest control comprising
a hollow station suspended at a location of use;

a pheromone of a pest to be controlled; and
a contact pesticide for the pests to be controlled,
wherein the hollow station is an angulated tube comprising:
- two suspended openings facing downwards;
- an overall design configured to allow pests to enter and exit the hollow station while still alive and contaminate other members of their own species with the contact pesticide; and
- an interior geometry designed so that from every point in space within the interior of the hollow station there exists at least one linear, unimpeded line to at least one point in space outside the apparatus, wherein at least one of the suspended openings forms at least one entrance and one exit for the pests to be controlled, and wherein the contact pesticide is provided inside the hollow station; and
wherein the hollow station comprises coated inside walls, the coated inside walls providing no footing for the pests.

13. The apparatus of claim 12, wherein the pheromone is 4-[p-hydroxyphenyl]-2-butanone acetate.

14. The apparatus of claim 12, wherein the contact pesticide is selected from the group consisting of phenylpyrazole pesticides, organo(thio)phosphates, macrocyclic lactones, carbamates and neonicotinoid pesticides.

15. The apparatus of claim 12, wherein the phenylpyrazole pesticide is selected from the group consisting of fipronil, acetoprole and ethiprole.

16. The apparatus of claim 12, wherein the phenylpyrazole pesticide is fipronil.

17. The apparatus of claim 12, wherein the neonicotinoid pesticide is selected from the group consisting of imidacloprid, thiamethoxam, clothianidin, acetampirid and thiacloprid.

18. The apparatus of claim 12, wherein the hollow station protects the pheromone and the contact pesticide from rainwater.

* * * * *